United States Patent
Gebauer et al.

(10) Patent No.: US 11,983,000 B2
(45) Date of Patent: May 14, 2024

(54) DEVICE FOR OUTPUTTING A FUTURE STATE OF A CENTRAL LUBRICATION SYSTEM

(71) Applicant: SKF LUBRICATION SYSTEMS GERMANY GMBH, Walldorf (DE)

(72) Inventors: Stefan Gebauer, Neustadt an der Weinstrasse (DE); Armin Guenther, Helmstadt-Bargen (DE); Dieter Hess, Ludwigshafen (DE); Juergen Kreutzkaemper, Waibstadt-Daisbach (DE); Andreas Stellmach, Heddesheim (DE)

(73) Assignee: SKF LUBRICATION SYSTEMS GERMANY GMBH, Walldorf (DE)

( * ) Notice: Subject to any disclaimer, the term of this patent is extended or adjusted under 35 U.S.C. 154(b) by 152 days.

(21) Appl. No.: 17/313,032

(22) Filed: May 6, 2021

(65) Prior Publication Data

US 2021/0271237 A1    Sep. 2, 2021

Related U.S. Application Data

(63) Continuation-in-part of application No. 17/266,137, filed as application No. PCT/EP2019/069377 on Jul. 18, 2019.

(30) Foreign Application Priority Data

Aug. 20, 2018 (DE) ........................ 102018213996.2

(51) Int. Cl.
G05B 23/02 (2006.01)
F16N 7/38 (2006.01)
F16N 29/02 (2006.01)

(52) U.S. Cl.
CPC ......... *G05B 23/0283* (2013.01); *F16N 7/385* (2013.01); *F16N 29/02* (2013.01);
(Continued)

(58) Field of Classification Search
CPC ..... F16N 7/385; F16N 29/02; G05B 23/0283; G05B 23/0224; G05B 23/0264; G05B 23/0267
See application file for complete search history.

(56) References Cited

U.S. PATENT DOCUMENTS 3,526,127 A    9/1970  Sarkis
4,658,638 A    4/1987  Plahmer
(Continued)

FOREIGN PATENT DOCUMENTS

CN    105793637 A    7/2016
CN    106127192 A    11/2016
(Continued)

OTHER PUBLICATIONS

Hu et al., "Opportunistic predictive maintenance for complex multi-component systems based on DBN-HAZOP model" Process Safety and Environmental Protection 90 (2012) 376-388 (Year: 2012).*
(Continued)

*Primary Examiner* — John C Kuan
(74) *Attorney, Agent, or Firm* — J-TEK LAW PLLC; Scott T. Wakeman; Mark A. Ussai

(57) ABSTRACT

A device for outputting a future state of a central lubrication system includes at least one sensor for recording a parameter of the central lubrication system, a processing unit for processing the recorded parameter, determining a current state of the central lubrication system based on the processed parameter, and estimating a future state of the central lubrication system over a certain period of time based on the
(Continued)

current state and stored data, and an output unit for outputting the future state of the central lubrication system.

15 Claims, 1 Drawing Sheet

(52) U.S. Cl.
 CPC ..... *G05B 23/0224* (2013.01); *G05B 23/0264* (2013.01); *G05B 23/0267* (2013.01)

(56) References Cited

U.S. PATENT DOCUMENTS

| | | | |
|---|---|---|---|
| 5,646,341 | A | 7/1997 | Schricker et al. |
| 6,196,057 | B1 | 3/2001 | Discenzo |
| 6,286,363 | B1 | 9/2001 | Discenzo |
| 6,324,899 | B1 | 12/2001 | Discenzo |
| 6,449,580 | B1 | 9/2002 | Bardetsky et al. |
| 6,546,785 | B1 | 4/2003 | Discenzo |
| 6,587,812 | B1 | 7/2003 | Takayama |
| 7,581,434 | B1 | 9/2009 | Discenzo et al. |
| 11,169,135 | B2 | 11/2021 | Henneberg |
| 2003/0115977 | A1 | 6/2003 | Holweg et al. |
| 2004/0078171 | A1 | 4/2004 | Wegerich et al. |
| 2005/0262838 | A1* | 12/2005 | Kageyama ............. E02F 9/226 60/453 |
| 2014/0188404 | A1 | 7/2014 | Von Herzen et al. |
| 2015/0107329 | A1 | 4/2015 | Conley et al. |
| 2015/0198578 | A1 | 7/2015 | Worden et al. |
| 2015/0252944 | A1 | 9/2015 | Kreutzkaemper et al. |
| 2016/0312699 | A1 | 10/2016 | Teicholz et al. |
| 2018/0158261 | A1 | 6/2018 | Ottikkutti et al. |
| 2018/0336534 | A1 | 11/2018 | Kim |
| 2019/0101520 | A1 | 4/2019 | Henneberg |
| 2021/0027556 | A1 | 1/2021 | Zhang et al. |
| 2021/0271237 | A1 | 9/2021 | Gebauer et al. |
| 2021/0310612 | A1* | 10/2021 | Kreutzkaemper ........ F16N 7/00 |
| 2023/0081892 | A1 | 3/2023 | Nozuki et al. |

FOREIGN PATENT DOCUMENTS

| | | |
|---|---|---|
| EP | 3211417 A1 | 8/2017 |
| WO | 0155634 A2 | 8/2001 |

OTHER PUBLICATIONS

Office Action and Search Report from the Chinese Patent Office dispatched Dec. 31, 2021 in related Chinese application No. 201980054871.2, and translation thereof.

English translation of the International Search Report dated Feb. 27, 2020 for PCT/EP2019/069377.

\* cited by examiner

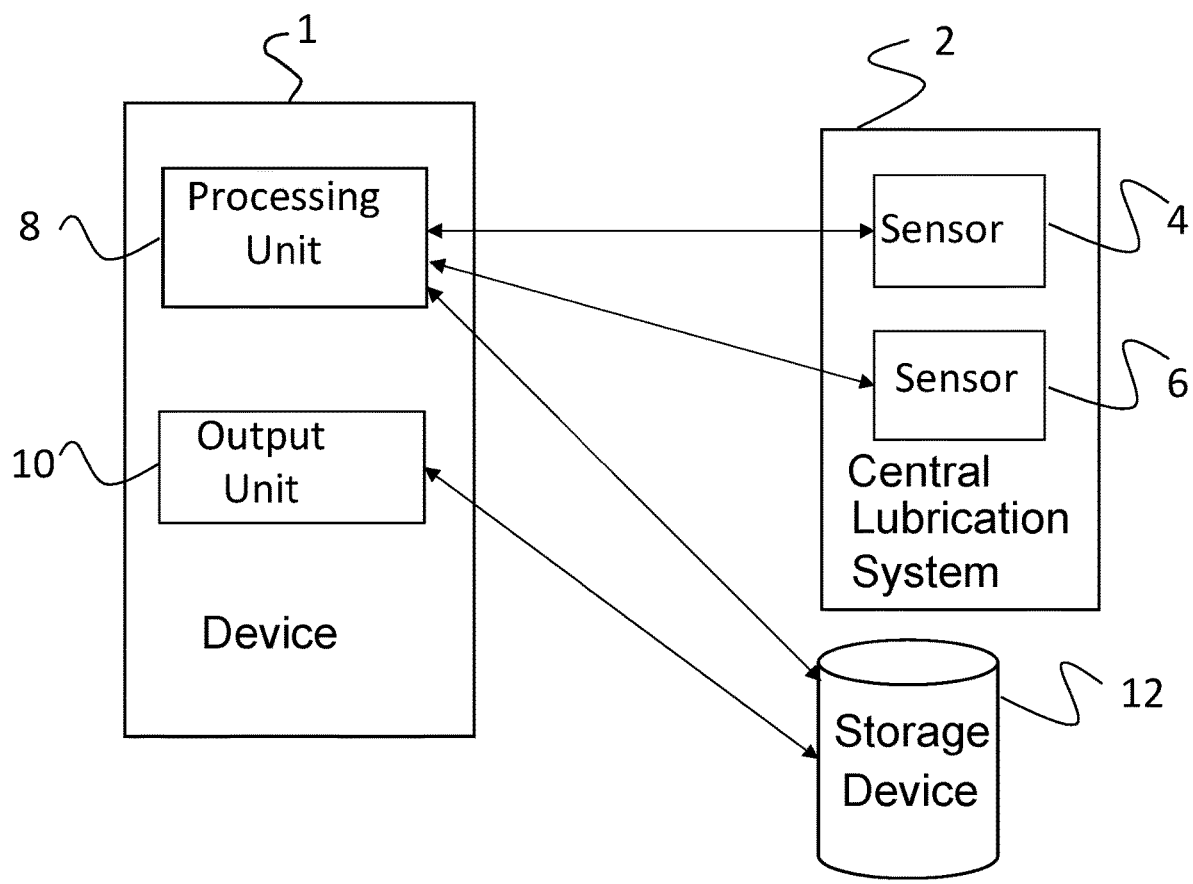

DEVICE FOR OUTPUTTING A FUTURE STATE OF A CENTRAL LUBRICATION SYSTEM

CROSS-REFERENCE TO RELATED APPLICATIONS

This application is a continuation-in-part of pending U.S. application Ser. No. 17/266,137, filed Feb. 5, 2021, which application is the U.S. National Stage of International Application No. PCT/EP2019/069377, filed on Jul. 18, 2019, which claims priority to German patent application no. 10 2018 213 996.2 filed on Aug. 20, 2018.

TECHNICAL FIELD

The present invention relates to a device for outputting a future state of a central lubrication system.

BACKGROUND

Lubrication systems in machinery, for example, agricultural machinery, are required to ensure sufficient lubrication of the various elements of the machinery. A failure of such a lubrication system can lead to a failure of the elements, such as, for example, of bearings, and thus to a failure of the entire machine. In order to prevent this, a monitoring of the lubrication systems is carried out, which can be effected via switches and sensors. Pressures, volume flows, temperatures, fill levels, cycles, etc. of the lubrication system, of the lubricant used, and/or of the elements can thereby be monitored. Usually, the transfer of this recorded information is effected from the lubrication system to a superordinate machine or vehicle control without processing the data. However, the sensors and switches here only reproduce signals about the actual state of the lubrication system, with the result that only already-existing states can be reacted to.

SUMMARY

It is therefore an aspect of the present disclosure to provide a device using which an estimation of a future state of the central lubrication system is possible.

The device includes a sensor for recording a parameter of the central lubrication system. The sensor can be, for example, a temperature sensor, a fill-level sensor, and/or a pressure sensor. Furthermore, the sensor can be a flow sensor or a sensor for detecting contaminants, particles, or lubricants. Other sensors are also possible. Furthermore, a combination of such sensors can also be used. The parameter can be, for example, pressures, volume flows, temperatures, fill levels, cycles, etc. of the central lubrication system. The recorded parameter is transferred to a processing unit. This processes the parameter and determines a current state of the central lubrication system based on the processed parameter. By using the current state as well as stored data, the processing unit can subsequently estimate a future state of the central lubrication system over a certain period of time. The future state of the central lubrication system can be output, via an output unit, for example, to the machine that is lubricated by the central lubrication system. A higher-level machine or vehicle control system can use this information in order to control the central lubrication system.

For example, when the sensor is a pressure sensor, it may be adapted to sense a lubricant pressure within the central lubrication system. The lubricant used in the central lubrication system may particularly be grease. Based on the sensed measurement values of the lubricant pressure, a processing unit may detect lubrication cycles and determine an average pressure of a lubrication cycle. In particular, the processing unit may be configured to continuously detect lubrication cycles and to determine an average pressure for each lubrication cycle. Subsequently, the processing unit may compare the determined average pressure of a lubrication cycle with a normal or standard pressure of the central lubrication system. Based on the result of the comparison, the processing unit may determine at least the actual state of the central lubrication system. In addition, the determined actual state may be compared with stored, historical date to estimate a future state of the central lubrication system, as explained above. For example, if the average pressure of each lubrication cycle is 0.1 psi greater than the average pressure of the previous lubrication cycle, the system may estimate that the average lubrication pressure after ten total lubrication cycles will be 1.0 psi greater than the average pressure of the first lubrication cycle. A calculation can then be performed to determine when (during which future lubrication cycle) the average pressure will exceed a maximum allowable lubrication pressure and action can be taken to correct the cause of this ongoing increase in average lubricant pressures before the maximum allowable pressure is reached or exceeded.

In contrast to previous systems, in this way not only is the actual state of the central lubrication system determined, but a forecast is also provided for a future state of the central lubrication system. Thus, even before the occurrence of a faulty state in the central lubrication system, reaction can occur and consequently failures of the entire system can be reliably counteracted. The future state of the central lubrication system can be a changed or unchanged state in comparison to the current state.

Central lubrication systems can be used in various machines. Depending on the application case, central lubrication systems can include various lubrication pumps and distributors that are adapted to the corresponding machine for distributing lubricant, in particular grease. Central lubrication systems usually have a control system that ensures an optimal supplying of each individual lubrication point. Here the bearings used in the machine can be regularly lubricated directly in running operation. At the bearings or other lubrication points, the lubricant, in particular grease, may be used for lubrication and, when used, it may be removed and replaced by new lubricant from the central lubrication system.

The device can include at least one second sensor for recording a further parameter of the central lubrication system, and/or the sensor can be configured for recording at least two parameters. In this way the processing unit can estimate the future state of the central lubrication system based on a combination of two or more parameters.

In the following, some examples of parameters are mentioned that in combination provide a certain error pattern in the central lubrication system or a forecast about the performance of the central lubrication system. However, it should be noted that these are only examples, and they are not to be considered as limiting, but rather a variety of combinations is possible. For example, the number of operating hours until a refilling of the lubricant tank can be determined by a combination of the current fill-level indicator and a lubrication interval and a volume of lubricant dispensed per lubrication interval (or a lubrication volume per time unit). For example, if the fill-level indicator indicates that 10 ounces of lubricant remain in a reservoir and the lubricant interval is once per hour and the lubricant amount is 0.5 ounce, it can be determined that a lubricant refill will be required before 20 hours. A combination of pressure, time, and temperature can indicate the wear of the injectors, a leakage in the main line, defective valves, or a defective pump. Information about the hydraulic pressure at the input of the pump and the grease pressure at the output of the pump can reveal a blockage/damage of the pump. For example, during normal operation, a difference between the grease pressure at the input of the pump and a grease pressure at the output of the pump should remain substantially constant. An increase or decrease in this pressure difference may indicate a blockage or pump damage. The pressure at the hydraulic input, the pressure at the lubricant outlet, the pumping quantity of the lubricant, and the temperature can in combination indicate the efficiency of the pump or also pump damage. The hydraulic pressure at the input, the pressure at the output, and the time duration for a cycle can indicate the wear on the piston seal. Instead of the hydraulic pressure at the input of the hydraulic motor, with electrically driven pumps the motor current can be used as a comparable data source.

The future state can in particular indicate a failure probability of the central lubrication system and/or a maintenance timing of the central lubrication system. The failure probability can be determined, for example, by the detection of signal changes of the parameters recorded by the sensors. The maintenance timing can be, for example, the pre-calculation of the operating hours up to the next refilling in a manner depending on the consumption.

By determining the failure probability and/or of the maintenance time point the failure risk of the machine can be reduced. Repair times can be better planned. If, for example, the lubricant consumption is recorded over time, a pre-ordering of lubricant is possible, and the maintenance can be carried out appropriately. Furthermore, consequential damage to the machine can be avoided, since faults are recognized even before they lead to machine failure.

According to a further embodiment the current state of the central lubrication system can indicate a fault of the central lubrication system. Based on the parameters, the processing unit can determine the position of such a fault. In this way, in addition to a forecast about future failures an improvement of the determining of actual, already occurring faults can be achieved.

As described above, multiple pressure sensors may be used which can be arranged at different positions within the central lubrication system. Multiple pressure sensors may provide the advantage that pressure information may be sensed at multiple positions, allowing an especially accurate determination of the position of a fault. In this case, the processing unit may determine the average pressure of the whole central lubrication system but also the pressure at each individual position, for example at the outlets or inlets of distributors of the central lubrication system.

Since based on a combination of sensor signals (e.g., due to lack of one or more signals) it can be determined where a fault has occurred, repair times can be better planned and reduced since the damage source can already be identified early on. For this purpose, the output unit can output the current state of the central lubrication system and the position of the fault. By indicating the fault (the current state of the central lubrication system) and the position, the method and/or the material in the event of a fault can be determined in a simple manner. For example, the required specialist (mechanical- or electrical-field) can be determined and the damaged parts can be ordered in advance. The repair times can thus be reduced.

According to one embodiment the stored data are historical data. These can have been determined and stored based on past faults, failures, and states. In particular, the data can be stored in the form of a lookup table.

In a further embodiment the output unit can transmit the current and/or the future state to a storage device. These states can be stored in the storage device, for example, as historical data and used for a further recognition of states.

The storage device can in particular be an external storage device, for example, a cloud storage. The output unit can communicate with the storage device via a radio connection. The radio connection can be a Bluetooth or a mobile connection. Other types of communication connection are also possible.

The data transmitted to the external storage device can also be used for external state monitoring. This means that in this case no monitoring is required on site, but rather can be remote and carried out centrally.

In the following, an example for determining an actual operation state of the central lubrication system will be described. It should be noted that also other implementations are possible. Further, this example may also be used for detecting future states of the central lubrication system, for example when the values which are determined during the operation of the central lubrication system are compared with historical data. For example, when only some of the values as described below are determined, these values may be compared with historical data and a trend of the state of the central lubrication system may be estimated based on this comparison.

As described above, a processing unit may detect lubrication cycles and determine an average pressure of a lubrication cycle. Thus, not only a lubricant pressure, for example an increasing or decreasing pressure, may be determined, but an average pressure over a lubrication cycle may be determined and compared with a normal pressure, which corresponds to a normal operation state of the central lubrication system. By comparing the actual average pressure with a normal pressure, it is possible to detect whether the central lubrication system is operating properly or whether there is a faulty state of the central lubrication system.

Further, a maximum pressure of a lubrication cycle or a minimum pressure of a lubrication cycle may be determined. The sensor may continuously transmit measured values to the processing unit, which may, in turn, determine the pressure values of a maximum pressure and a minimum pressure from these measured values. The average pressure may be calculated as an average value based on all measured pressure values.

The determined state of the central lubrication system may indicate for example a fault-free operation, a fault of the central lubrication system or no function of the central lubrication system.

According to a further embodiment, the processing unit may be adapted to recognize a lubrication cycle based on pressure variations of the central lubrication system. The pressure within the system varies during one lubrication cycle, depending on the individual structure of the central lubrication system (e.g., number of components, length of lines, etc.). As the variations are identical for each lubrication cycle, the processing unit may detect a start and end of a lubrication cycle.

As described above, the sensor may sense a pressure as well as a temperature of the central lubrication system. Based on the sensed temperature, the processing unit may be adapted to allocate the average pressure to a temperature window. Lubricant and thus the pressure of the lubricant strongly depend on the temperature. To compare the average pressure with a normal pressure being valid for the actual temperature, the actual temperature of the central lubrication system may be determined and allocate to a temperature window. The size of the temperature window may be chosen arbitrarily, for example, temperature windows may be defined with a range of 5 degree Celsius. After choosing the corresponding temperature window, the processing unit may retrieve the normal pressure of the central lubrication system being associated with this temperature from a database. The database may be part of the processing unit or may be remotely arranged, for example on a server. For example, normal pressures for multiple temperature windows may be stored in the data base.

If the data base has no entry of a normal pressure for a specific temperature window, the processing unit may add the actually determined average pressure as normal pressure for the actual temperature window. Thus, it is possible to extend the data bank if there are no data entries for an actual temperature window. In this case, it may be assumed that the central lubrication system works without fault at the beginning of the operation of the central lubrication system so that an actual average pressure may be considered as normal pressure for a temperature window at the beginning of the operation of the central lubrication system, when the data base does not include sufficient data so far.

Further, the processing unit may be adapted to extend the data base continuously. This means that, when a fault-free operation of the central lubrication system has been determined, the processing unit may use the actual average pressure of a temperature window to update the normal pressure of the central lubrication system for this temperature window within the data base. The normal pressure of the central lubrication system may be defined as an average of pressure values within a temperature window, wherein these pressure values are associated with a fault-free operation of the central lubrication system. Thus, if a fault-free operation of the central lubrication system is detected, the actual average pressure may be added to the already existing average pressure values of this temperature window and the average value of all average pressure values may be stored as the updated normal pressure of the central lubrication system for the present temperature window. Thus, by updating the data base continuously, a kind of self-learning system may be implemented.

As described above, the processing unit may detect a fault-free operation, a fault of the central lubrication system or no function of the central lubrication system.

No function of the central lubrication system means that the processing unit may detect no function of the central lubrication system at all. This may be the case when there is a complete failure of the central lubrication system or when the sensor(s) failed completely.

A malfunction or fault of the central lubrication system may be for example a blockage of a lubricant line or a piston, a lubricant line kink, a lubricant line rupture or any other kind of malfunction of the central lubrication system. In particular, when there is a malfunction or fault of the central lubrication system, a certain amount of lubricant may still be transported.

For example, the processing unit may detect a blockage of a lubricant line, when at least three consecutive average pressure values are greater by a factor k than the temperature-dependent normal pressure and the average pressure values continuously increase. Alternatively, a blockage may be assumed when one value of the average pressure is greater by 200% than the normal pressure. A blockage means that a lubricant line is blocked by foreign matter, fat deposition or the like. In particular, such a blockage may built-up continuously, for example by decreasing the passage of the lubricant line further and further.

The processing unit may detect a lubricant line kink when at least three consecutive average pressure values are greater by a factor k than the temperature-dependent normal pressure and the average pressure values non-continuously increase.

If the processing unit detects at least three consecutive average pressure values being smaller by a factor k than the temperature-dependent normal pressure, wherein the average pressure values non-continuously decrease, this may indicate a lubricant line rupture. Such a lubricant line rupture leads to leakage of the lubricant, which decreases the pressure within the central lubrication system.

If continuously decreasing pressure values are detected, this may be a hint to an increasing leakage, for example a hole in a lubricant line getting bigger.

The factor k may be determined based on experiments. Further, the factor k may be adjustable, for example individual adjustable to each central lubrication system. It may also be adjusted in the case of many false positives or false negatives.

If any other kind of deviation from the normal pressure is detected, which cannot be allocated to a specific kind of malfunction, this may be defined as a general malfunction of the central lubrication system.

If a regular change between the lubrication cycles and break times is detected and there are no relevant deviations of the average pressure values from the normal pressure, this may be interpreted as a fault-free operation of the central lubrication system.

Furthermore, a method is disclosed for outputting a future state of a central lubrication system. The method includes the following steps: recording a parameter of the central lubrication system, processing of the recorded parameter, determining a current state of the central lubrication system based on the processed parameter, estimating a future state of the central lubrication system over a certain time period based on the current state and stored data, and outputting the future state of the central lubrication system.

Furthermore, a computer program product is disclosed that includes a program code that is configured to trigger the carrying out of the method as explained above on a computer.

A computer program product, such as, for example, a computer program medium, can be provided or delivered as a storage medium, such as, e.g., storage card, USB stick, CD-ROM, DVD, or also in the form of a downloadable file from a server in a network. This can be effected, for example, in a wireless communication network by the transmission of a corresponding file including the computer program product or the computer program means.

Further advantages and advantageous embodiments are specified in the description, the drawings, and the claims. Here in particular the combinations of features specified in the description and in the drawings are purely exemplary, so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

BRIEF DESCRIPTION OF THE DRAWINGS

FIG. 1 shows a schematic block diagram of a device for outputting a future state of a central lubrication system.

DETAILED DESCRIPTION

In the following, identical or functionally equivalent elements are designated by the same reference numbers.

FIG. 1 shows a device 1 for outputting a future state of a central lubrication system 2. The device 1 can be disposed separate from the central lubrication system 2 or can form a part of the central lubrication system 2.

In order to detect a state of the central lubrication system 2, the device 1 includes one or more sensors 4, 6. These sensors 4, 6 serve to record parameters of the central lubrication system 2, such as, for example, temperatures, pressures, volume flows, etc.

These parameters are processed by a processing unit 8. Based on the parameters and stored data a current state of the central lubrication system is thereby determined and a future state of the central lubrication system is estimated. The stored data can be stored in a storage device 12.

In particular, the processing unit 8 determines the current and the future state of the central lubrication system 2 based on a combination of the parameters of the sensors 4, 6. In this way in addition to the current state, i.e., possible already occurring faults, of the central lubrication system 2 a failure probability of the central lubrication system 2 for the future and/or a maintenance timing can also be estimated. In this way repair times can be easily planned. Downtime due to failures of the central lubrication system 2 can be reduced since it can already be estimated in advance when a failure/fault will occur, and therefore countermeasures can already be taken before a failure.

The parameters can be, for example, a current fill-level indicator and a lubrication interval per time unit. Based thereon the processing unit 8 can estimate the number of operating hours until a refilling of the lubricant tank.

In addition to the future state, the processing unit 8 can precisely specify the current state based on the parameters. This means that in the case of a fault, not only the fault itself, but also the position of the fault can be determined. For this purpose, a combination of parameters is also used. Various combinations of parameters with their associated error pattern can be stored in the storage device 12.

An output unit 10 can be used to output the current state and the future state. On the one hand the output unit 10 can indicate these states. On the other hand, the output unit 10 transmit these states to the storage device 12. The output unit 10 or the processing unit 8 can communicate with the storage device 12 via a communication connection, in particular a radio connection.

In the following, an exemplary method for determining an actual operation state of the central lubrication system 2 will be described. It should be noted that also other implementations are possible. Further, this example may also be used for detecting future states of the central lubrication system 2. The method may be executed by the processing unit 8 as described above.

In a first step S1, the measured values of the sensors 4, 6 are transmitted to the processing unit 8. The sensors 4, 6 may sense the lubricant pressure as well as the temperature within the central lubrication system 2.

In step S2, the received measured values may be stored as variables, for example in the form of an array having multiple values per time. The multiple values include at least the pressure and the temperature of the central lubrication system 2 per time.

In step S3, the processing unit 8 determines the start and end points of the lubrication cycles based on the measured values. A lubrication cycle may be detected by allocating pressure variations within the measured values to a start and an end of a lubrication cycle. For example, pressures readings may be substantially constant or remain below a predetermined level between lubrication cycles. The first measurement of a pressure above that predetermined pressure may indicate the beginning of a lubrication cycle and the drop of the pressure to below the predetermined level may indicate the end of the lubrication cycle.

If a lubrication cycle is detected, the processing unit 8 calculates an average pressure per lubrication cycle (step S4). The average pressure may be in particular an average value of all pressure values of one lubrication cycle.

In step S5, the processing unit 8 stores an average pressure of the lubrication cycle, a maximum pressure of the lubrication cycle, a minimum pressure of the lubrication cycle and a temperature of the lubrication cycle.

Then, in step S6, the processing unit 7 may allocate the average pressure to a temperature window, dependent on the temperature of the actual lubrication cycle. For allocating the average pressure to a temperature window, the processing unit 8 may retrieve information from a storage or data base 12, in which the existing temperature windows are stored with corresponding normal pressure values. If no normal pressure for the actual temperature window exists, the processing unit 8 may enter into a learning phase, which will be explained below.

If a normal pressure for the actual temperature window exists, the processing unit 8 may compare the actual average pressure with the normal pressure of the temperature window in step S7.

Then, the processing unit 8 may interpret the result in step S8, as described in the following. Generally, the processing unit 8 may detect a fault-free operation (E6), a fault of the central lubrication system 2 (E2-E5) or no function of the central lubrication system 2 (E1).

If the sensor 4, 6 has no signal or if the measured values do not contain any pressure variations, the processing unit 8 may determine that there is no function (E1) of the central lubrication system 2. This may be the case when there is a complete failure of the central lubrication system 2 or when the sensor(s) 4, 6 failed completely.

The processing unit 8 may detect a blockage of a lubricant line (E2), when at least three consecutive average pressure values are greater by a factor k than the temperature-dependent normal pressure and the average pressure values continuously increase. Alternatively, a blockage may be assumed when one value of the average pressure is greater by 200% than the normal pressure. A blockage means that a lubricant line is blocked by foreign matter, fat deposition or the like. In particular, such a blockage may built-up continuously, for example by decreasing the passage of the lubricant line further and further.

The processing unit 8 may detect a lubricant line kink (E3) when at least three consecutive average pressure values are greater by a factor k than the temperature-dependent normal pressure and the average pressure values non-continuously increase. The factor k for detecting a kink may be less than the factor k for detecting a blockage as some lubricant may still flow past a kink.

If the processing unit 8 detects at least three consecutive average pressure values being smaller by a factor k than the temperature-dependent normal pressure, wherein the average pressure values non-continuously decrease, this may indicate a lubricant line rupture (E4). Such a lubricant line rupture leads to leakage of the lubricant, which decreases the pressure within the central lubrication system 2.

If any other kind of deviation from the normal pressure is detected, which cannot be allocated to a specific kind of malfunction, this may be defined as a general malfunction of the central lubrication system (E5) by the processing unit 8.

If the processing unit 8 detects a regular change between the lubrication cycles and break times and there are no relevant deviations of the average pressure values from the normal pressure, this may be interpreted as a fault-free operation of the central lubrication system 2 (E6). In this case, the processing unit 8 may use this information to update the data base 12. This means that the actual values may be used for the learning phase SE1-SE to provide more accurate information for the further operation.

The actually determined average pressure may be used for updating the data base 12 of the normal pressure of the temperature window (SE1). If there already exists a value for the actual temperature window, the average pressure may be used to calculate a new normal pressure value (SE2). The normal pressure value is an average of all fault-free pressure values of one temperature window. Thus, each time, when the processing unit 8 detects a fault-free state (E6), the data base 12 is updated accordingly, and the stored normal pressure will increase its accuracy.

If it has been detected in step S6 that there is no normal pressure for the actual temperature window, the data base 12 will not be updated but extended. The actually measured and calculated average pressure of the temperature window will be stored as normal pressure for the actual temperature window. As it may be assumed that the central lubrication system 2 works without fault at the beginning of the operation of the central lubrication system 2, this actual average pressure may be considered as normal pressure for the temperature window.

In summary, by the above-described device not only can the current state of a central lubrication system be determined, but an estimation about a future state of the central lubrication system can also be carried out. In this way it is possible to already take corresponding countermeasures or correspondingly plan maintenance and repairs even before a fault or failure of the central lubrication system.

REFERENCE NUMBER LIST

1 Device
2 Central lubrication system
4, 6 Sensors
8 Processing unit
10 Output unit
12 Storage device
S1-S8 method steps
SE1-SE2 learning phase

What is claimed is:

1. A system comprising:
a central lubrication system, and
a device for outputting a future state of the central lubrication system, the device including:
at least one sensor for recording at least two parameters of the central lubrication system, wherein each of the at least two parameters is selected from a group consisting of pressure, volume flow, temperature, fill level, contamination and cycles,
a processing unit for processing the at least two parameters to determine a current state of the central lubrication system based on the at least two parameters, and estimating the future state of the central lubrication system over a certain period of time based on the current state and stored data, and
an output unit for outputting the future state of the central lubrication system,
wherein the stored data comprises an error pattern associated with each of a plurality of combinations of the at least two parameters.

2. The system according to claim 1, wherein:
the at least one sensor is configured to record the at least two parameters.

3. The system according to claim 2,
wherein the future state indicates a failure probability of the central lubrication system and/or a maintenance timing of the central lubrication system,
wherein the current state of the central lubrication system indicates a fault of the central lubrication system, and the processing unit is configured to determine a position of the fault,
wherein the output unit is configured to output the future and/or current state of the central lubrication system and the position of the fault to a storage device, and
wherein the stored data are historical data.

4. The system according to claim 2,
wherein the future state indicates a failure probability of the central lubrication system.

5. The system according to claim 4, wherein the at least one sensor comprises a fill-level sensor or a flow sensor.

6. The system according to claim 1, wherein the future state indicates a failure probability of the central lubrication system and/or a maintenance timing of the central lubrication system.

7. The device according to claim 1, wherein the current state of the central lubrication system indicates a fault of the central lubrication system, and wherein the processing unit is configured to determine a position of the fault.

8. The system according to claim 7, wherein the output unit is configured to output the current state of the central lubrication system and the position of the fault.

9. The system according to claim 7,
wherein the processing unit is configured to determine a position of the fault based on the combination of the at least two parameters and the error pattern associated with the combination of the at least two parameters.

10. The system according to claim 1, wherein the stored data are historical data.

11. The system according to claim 1, wherein the output unit is configured to transmit the current and/or the future state to a storage device.

12. The system according to claim 11, wherein the storage device is an external storage device and the output unit is configured to communicate with the storage device via a communication connection.

13. The system according to claim 12, wherein the communication connection is a radio connection.

14. The system according to claim 1,
wherein the future state indicates a failure probability of the central lubrication system.

15. The system according to claim 1, wherein the at least one sensor comprises a fill-level sensor or a flow sensor.

* * * * *